United States Patent [19]

Exner et al.

[11] Patent Number: 5,787,364
[45] Date of Patent: Jul. 28, 1998

[54] TRANSPARENT CALL PROGRESS

[75] Inventors: James Walter Exner, Plano; Lynn Wesley Hitchcock, Garland, both of Tex.; Edward Jung, West Orange; Craig Matthews, Tinton Falls, both of N.J.

[73] Assignee: Paradyne Corporation, Largo, Fla.

[21] Appl. No.: 380,872

[22] Filed: Jan. 30, 1995

[51] Int. Cl.$^6$ .................... H04Q 7/00; H04Q 9/00
[52] U.S. Cl. ............ 455/560; 455/422; 455/561; 379/93.01; 379/93.14; 379/100.06
[58] Field of Search ............ 379/58–63, 93.01, 379/93.14, 100.06; 370/79; 455/54.2, 33.1, 33.2, 422, 561; 375/222, 223

[56] References Cited

U.S. PATENT DOCUMENTS

| | | | |
|---|---|---|---|
| 4,837,800 | 6/1989 | Freeburg et al. | 379/59 |
| 4,860,287 | 8/1989 | Kelly | 370/108 |
| 5,134,611 | 7/1992 | Steinka et al. | 370/79 |
| 5,479,480 | 12/1995 | Scott | 379/59 |
| 5,483,576 | 1/1996 | Staples | 379/58 |
| 5,487,175 | 1/1996 | Bayley et al. | 445/54.2 |
| 5,528,625 | 6/1996 | Ayanoglu et al. | 375/222 |
| 5,544,227 | 8/1996 | Blust et al. | 379/63 |
| 5,574,773 | 11/1996 | Grob et al. | 379/58 |
| 5,590,406 | 12/1996 | Bayley et al. | 379/59 |

FOREIGN PATENT DOCUMENTS

| | | | |
|---|---|---|---|
| WO 92 22976 A | 12/1992 | WIPO | H04M 11/06 |
| WO 95 22875 A | 8/1995 | WIPO | H04Q 7/22 |
| WO 97 23113 A | 6/1997 | WIPO | H04Q 7/38 |

OTHER PUBLICATIONS

Weissman, et al., "Interoperable Wireless Data," IEEE Communications Magazine, vol. 31, No. 2, pp. 68–77.

*Primary Examiner*—Paul Loomis
*Assistant Examiner*—Binh K. Tieu
*Attorney, Agent, or Firm*—Thomas, Kayden, Horstemeyer & Risley LLP

[57] ABSTRACT

A cellular modem pool provides call progress information to a calling party during call setup. In particular, the cellular modem pool includes a coupling means, which communicates any signals between the cellular-side of the cellular data connection and the PSTN-side of the cellular data connection during call setup. This allows the calling party to hear the call progress on the called party side of the data call. In addition, the cellular modem pool monitors the signals for a data signal provided by the called party, e.g., a predefined answer tone. Once the answer tone is detected, the cellular modem pool opens the connection provided by the coupling means and processes the respective signals on the cellular-side and the PSTN-side of the cellular modem pool.

6 Claims, 3 Drawing Sheets

TRANSPARENT CALL PROGRESS

BACKGROUND OF THE INVENTION

The present invention relates to data communications equipment, e.g., modems, and, more particularly, to cellular modem pools.

Generally speaking, a switched cellular data connection can be characterized as comprising two different types of communications channels. First, there is the cellular communications channel for coupling a cellular user to a Mobile Switching Center (MSC), and then there is a "land-line" communications channel, which is typically provided by the Public Switched Telephone Network (PSTN), for further coupling the cellular user to a PSTN-based data endpoint. As used herein, the term "land-line" refers to the remaining, i.e., non-cellular, communications channels provided by the PSTN, e.g., T1, local-loop, etc., whether using conducted transmission, e.g., a "tip-ring" pair, or radiated transmission, e.g., microwave transmission.

A cellular communications channel is sometimes referred to as an "impaired channel" since it is affected by a number of channel impairments like Rayleigh fading, co-channel interference, etc., that increase the error rate and, thus, degrade the overall performance of the mobile connection. This is in contrast to a land-line communications channel, where the predominant impairment is additive white gaussian noise (AWGN). As a result, those in the art have realized that when transmitting data in the cellular environment it is advantageous to use a "cellular modem pool" in the MSC to more effectively combat the different types of channel impairments presented by both the cellular and PSTN environments.

A cellular modem pool comprises a number of pairs of modems, in which the data terminal equipment (DTE) ports of each modem pair are cross-connected in a "back-to-back" fashion. This allows the two modems of each pair to interchange data via their DTE ports and thereby isolate that portion of the data connection over the cellular communications channel from that portion of the data connection through the PSTN. This isolation allows the use of a data protocol that is better suited to combating the effects of the cellular environment over the cellular portion of the data connection. One example of a cellular-oriented protocol is the "Enhanced Throughput Cellular" (ETC) protocol, developed by AT&T Paradyne. Similarly, on the PSTN side of the data connection, the cellular modem pool concept allows the modems at each endpoint of the PSTN connection to use a more traditional, e.g., V.42, land-line oriented protocol.

Typically, in order to establish a cellular data connection through a cellular modem pool, a cellular user dials both an access code and a telephone number associated with the called party. The access code informs the MSC to switch the incoming call through a modem pair of the cellular modem pool. Once the modem pair is switched in, the cellular side of the cellular modem pool negotiates, e.g., performs training, etc., with data communications equipment (DCE) of the cellular user. While the cellular portion of the data connection is being established, the PSTN portion of the data call is concurrently being setup, e.g., the telephone number of the called party is provided to the PSTN network.

Unfortunately, once the modem pair of the cellular modem pool is switched in, a cellular user can no longer hear the PSTN side "call progress" during the "data call setup" portion of the data call. As used herein, "data call setup" is that portion of a data call before data communications equipment of the called party provides answer tone. Consequently, if the PSTN side of the telephone call does not establish for some reason (for instance, if the number is busy, rings without answering, a wrong number is dialed and someone answers, etc.,) the cellular user has no idea what happened.

SUMMARY OF THE INVENTION

We have discovered a way to provide call progress information to a calling party when attempting to establish a cellular data connection through a cellular modem pool. In particular, the cellular modem pool couples call progress information between the cellular-side and the PSTN-side during the data call setup portion of the data call. That is, the cellular modem pool provides "transparent call setup."

In an embodiment of the invention, a modem pair of a cellular modem pool is coupled to a cross-connect switch, which communicates call progress information between the cellular-side and the PSTN-side during data call setup. The modem pair of the cellular modem pool monitors the call progress information for a data signal provided by a DCE of the called party, e.g., a predefined answer tone. Once the answer tone is detected, the modem pair opens the connection provided by the cross-connect switch and each modem of the modem pair processes the respective signals on the cellular-side and the PSTN-side of the data connection, e.g., each modem begins training, etc., with a respective endpoint.

In another embodiment of the invention, the time-division multiplex (TDM) bus digital signal processors of a mu-law modem pair, of a cellular modem pool, are coupled together to communicate call progress information between the cellular side and the PSTN side of the data connection. Like the embodiment described above, this communications path is opened upon the detection of a predefined data signal, e.g., an answer tone.

DETAILED DESCRIPTION

Figure 1:
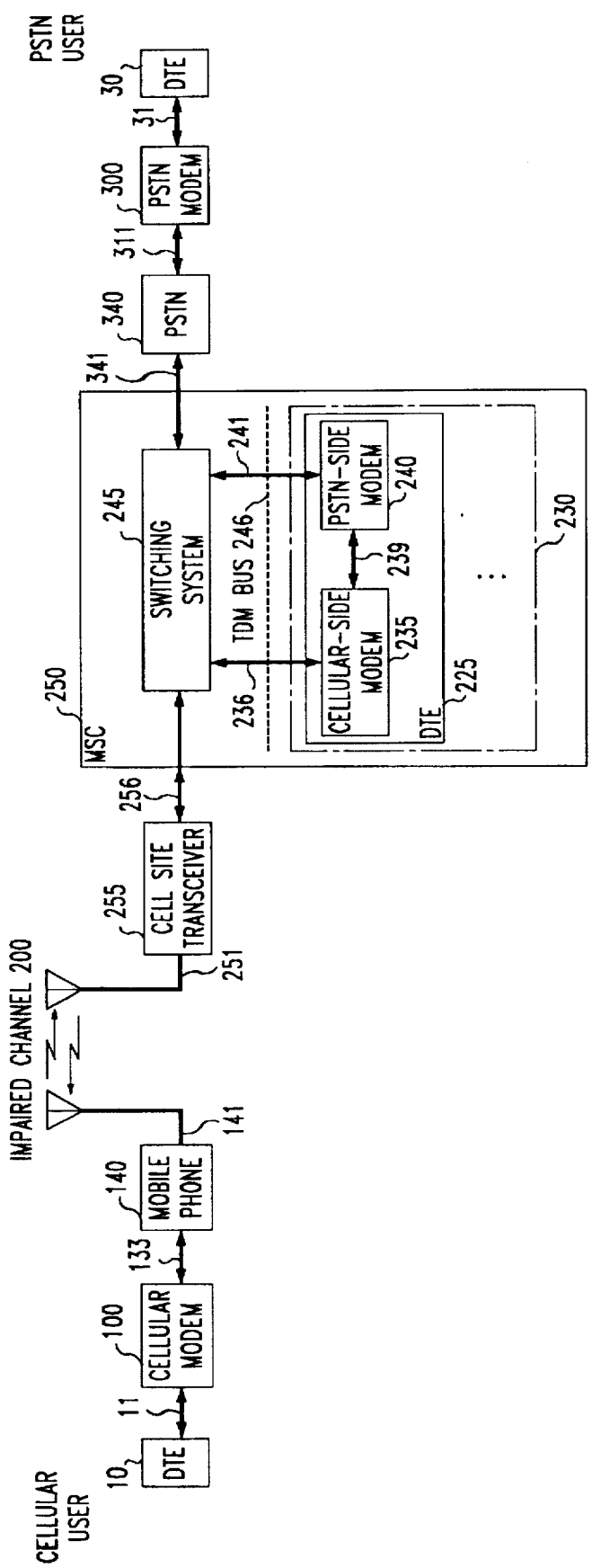
FIG. 1 is a block diagram of a prior art cellular data communications system including a cellular modem pool.

Before describing the inventive concept, reference should be made to FIG. 1 which shows a prior art cellular data connection through a cellular modem pool. For the moment, it is assumed that the cellular data connection has already been established between the cellular data endpoint, as represented by DTE 10 and cellular modem 100, and the PSTN data endpoint, as represented by DTE 30 and PSTN modem 300. The "cellular user" is associated with the cellular data endpoint and the "PSTN user" is associated with the PSTN data endpoint. The cellular data connection will be described in the context of transmitting data from DTE 10 to DTE 30. Transmission in the opposite direction, i.e., from DTE 30 to DTE 10, occurs in a complementary fashion and will not be described.

As shown in FIG. 1, DTE 10 provides data to modem 100 via line 11. The latter represents the signaling, electronics, and wiring, for conforming to a DTE/DCE interface standard like EIA RS-232. Modem 100 modulates the data signal from DTE 10 to, typically, a quadrature amplitude modulated (QAM) signal, which is provided on line 133. The latter couples the QAM signal from modem 100 to mobile phone 140. As known in the art, line 133 may include an RJ11 adapter for coupling the DCE interface of modem 100 to the local signaling interface of the mobile phone. The cellular transceiver (not shown) of mobile phone 140 further modulates the QAM signal provided by modem 100 onto a cellular carrier, which is transmitted to cell site transceiver 255, via impaired channel 200. Cell site transceiver 255 demodulates the received cellular signal to provide a received digital version of the QAM signal to MSC 250 via line 256, which is typically a T1 facility.

MSC 250 includes switching system 245 and cellular modem pool 230. As known in the art, switching system 245 provides the received digital version of the QAM signal to modem pair 225 of cellular modem pool 230, via line 236. Modem pair 225 recovers the data signal provided by DTE 10 and remodulates this data signal for transmission over the PSTN portion of the cellular data connection. Modem pair 225 provides this remodulated data signal to the PSTN portion of the data connection via line 241. The PSTN portion of the cellular data connection is represented by PSTN facility 341, PSTN 340, and line 311, which represents the local-loop coupling PSTN modem 300 to a local exchange carrier (not shown) included within PSTN 340. It should be noted that lines 236 and 241 have been shown as separate lines for simplicity. However, lines 236 and 241 are typically representative of allocated time slots of time-division multiplexed bus 246 that couples each modem pair of cellular modem pool 230 to switching system 245.

Cellular modem pool 230 comprises a number of pairs of back-to-back modems. One such pair is modem pair 225, which is known in the art as a "mu-law" modem pair because modem pair 225 couples directly to the above-mentioned time-division multiplexed bus as represented by lines 236 and 241. Modem pair 225 comprises cellular-side modem 235 and PSTN-side modem 240, both of which are coupled together via their DTE interfaces as represented by line 239. As described earlier, cellular-side modem 235 and modem 100 terminate the cellular portion of the data connection, while PSTN-side modem 240 and modem 300 terminate the PSTN portion of the data connection. This allows, for example, cellular-side modem 235 and modem 100 to communicate data using a cellular-oriented protocol like AT&T Paradyne's ETC protocol, and for PSTN-side modem 240 and modem 300 to communicate data using a more traditional protocol like V.42.

Having described the data flow through an established cellular data connection, the data call setup procedure of the prior art is as follows. It is assumed that the cellular user initiates the data call and desires to utilize cellular modem pool 230. The cellular user dials both an access code and a telephone number associated with the called party, who is represented by the PSTN data endpoint associated with PSTN modem 300 and DTE 30. To perform the dialing function, the cellular user can enters the well-known "AT dialing command," via DTE 10. Upon detection, the access code informs switching system 245 of MSC 250 to switch the incoming call through cellular modem pool 230. As known in the prior art, switching system 245 selects an idle back-to-back modem pair of cellular modem pool 230 and assigns time slots as represented by lines 236 and 241 to the selected modem pair. In this example, the selected pair of back-to-back modems is represented by modem pair 225.

Once modem pair 225 of cellular modem pool 230 is switched in, switching system 245 provides a six digit code to modem pair 225 via line 236. As known in the art, this six digit code is a reference number, e.g., a pointer, associated with the actual telephone number, which is stored within switching system 245. In addition, this six digit code is represented by the well-known "multi-frequency" (MF) signaling, i.e., each digit is represented by a different set of frequency pairs. Cellular-side modem 235 detects the six digit code and passes this code to PSTN-side modem 240, via line 239. Cellular-side modem 235 and PSTN-side modem 240 communicate via the well known "AT-command mode." For example, upon detecting the existence of a MF signal sequence, cellular-side modem 235 converts the MF signal sequence to a data string, which, in this example, represents the six digit code, and provides this data string as part of an AT dial command. In response to this AT dial command, PSTN-side modem 240 goes "off-hook" and regenerates the MF signal sequence on line 241. Upon detecting the six digit code, switching system 245 retrieves, and dials, the called party telephone number. However, while PSTN-side modem 240 is setting up the PSTN side of the data connection, cellular-side modem 235 is already negotiating, i.e., performing training, etc., with cellular modem 100.

Unfortunately, once a modem pair of cellular modem pool 230 is switched in, it is not possible for the cellular user to hear the PSTN side "call progress" during the data call setup portion of the data call. Consequently, if the PSTN side of the telephone call does not establish for some reason (for instance, if the number is busy, rings without answering, a wrong number is dialed and someone answers, etc.,) the cellular user has no idea what happened.

Therefore, and in accordance with the inventive concept, we have discovered a way to provide call progress information to a calling party during setup of a data connection through a cellular modem pool. In particular, the cellular modem pool couples call progress information between the cellular-side and the PSTN-side during the call setup portion of the data call. That is, the cellular modem pool provides "transparent call setup."

Figure 2:
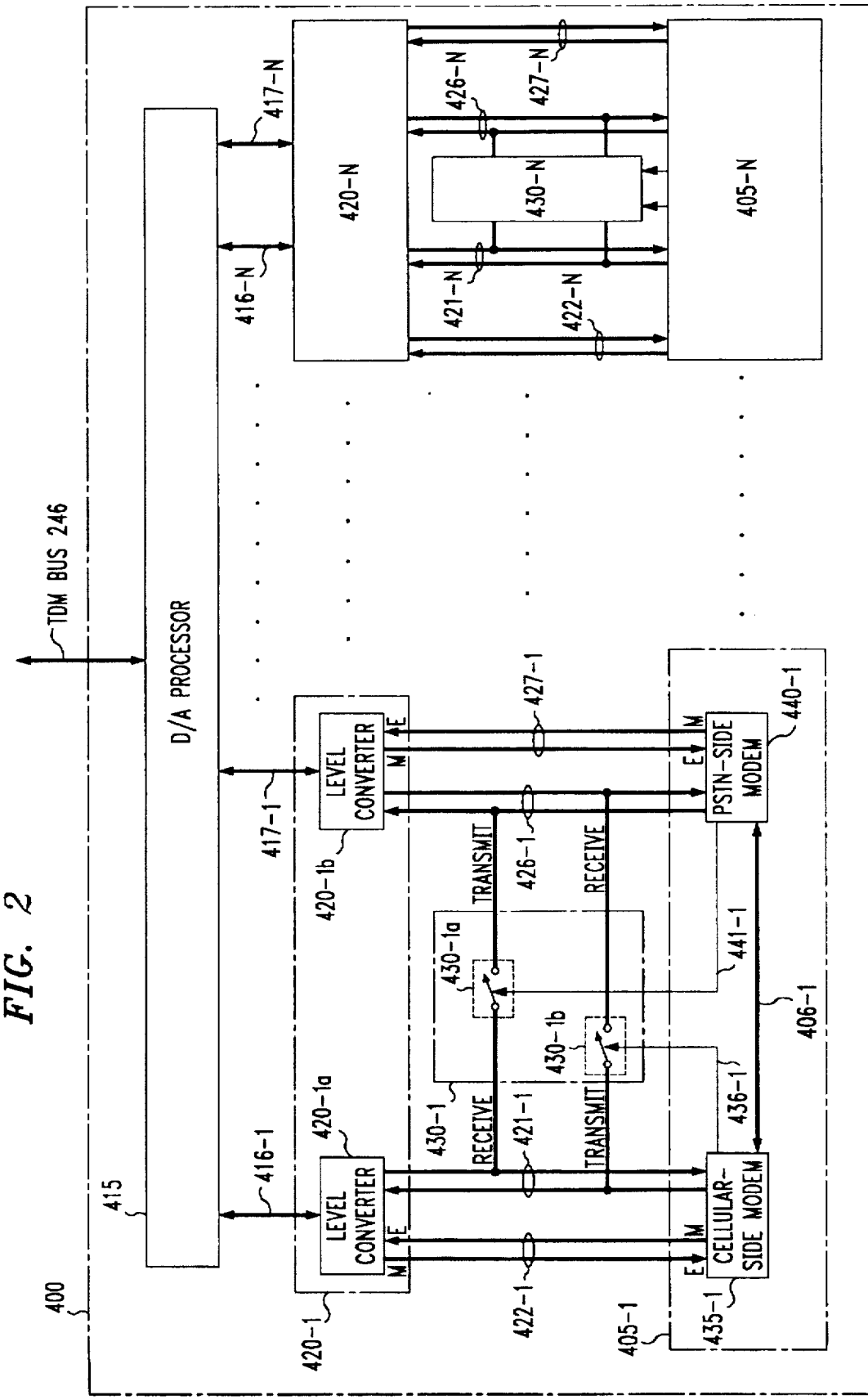
FIG. 2 is a block diagram of a cellular modem pool embodying the principles of the invention.

A cellular modem pool embodying the principles of the invention is shown in FIG. 2. Other than the inventive concept, the elements shown in FIG. 2 are well-known and will not be described in detail. The remaining components of the cellular data connection are identical to those elements shown in FIG. 1 and will not be further described. Also, like numbers in FIGS. 1 and 2 are representative of the same components. For example, TDM bus 246 of FIG. 2 and FIG. 1 is the same.

As shown in FIG. 2, cellular modem pool 400 includes digital/analog (D/A) processor 415, level converter pairs 420-1 to 420-N, switches 430-1 to 430-N, and modem pairs 405-1 to 405-N. D/A processor 415 functions as a "channel bank," which converts each assigned timeslot of TDM bus 246 into the analog domain, as represented by E&M signaling lines 416-1 and 417-1. As known in the art, each E&M signaling line comprises a 4-wire analog interface (a pair for each direction of transmission) and two "E&M control pairs" that couple the respective "M port" and "E port" (not shown) of D/A processor 415 and with a corresponding "E port" and "M port" (not shown) of a level converter. For example, associated with line 416-1 is an "M port" of D/A processor 415 that is coupled via an "E&M control pair" of line 416-1 to an "E port" of level converter 420-1a. Similarly, associated with line 416-1 is an "E port" of D/A processor 415 that is coupled via an "E&M control pair" of line 416-1 to an "M port" of level converter 420-1a. As known in the art, the two "E&M control pairs" provide call setup signaling like "off-hook," "wink," etc., in each direction between the telephone equipment. An example of D/A processor 415 is the "Acculink Access Controller" available from AT&T. As shown in FIG. 2, D/A processor 415 provides a pair of E&M signaling lines for each modem pair. For example, E&M signaling lines 416-1 and 417-1 are associated with modem pair 405-1. It should be realized that the term "wire" is used herein to represent any form of electrical conductor, e.g., an actual wire, printed circuit path, etc., Also associated with each modem pair of cellular modem pool 400 is a pair of level converters, as represented by level converter pair 420-1 and a switch, as represented by switch 430-1 (described below). Each level converter pair, e.g., level converter pair 420-1a, converts the E&M level signaling to TTL-compatible levels for compatibility with the electrical interface of modem pair 405-1, as represented by lines 421-1, 422-1, 426-1, and 427-1. Both lines 421-1 and lines 426-1 represent 4-wire interfaces, i.e., a transmit pair and a receive pair, to the respective modems. Since the E&M signaling is typically level-oriented, it is assumed that after the conversion to TTL compatible levels one wire is used for each direction of E&M signaling. Line 422-1 represents the E&M signaling pair between level converter 420-1a and cellular-side modem 435-1, while line 427-1 represents the E&M signaling pair between level converter 420-1b and PSTN-side modem 440-1. In accordance with a feature of the invention, the E&M signaling is passed through modem pair 405-1, as described below. It should be noted that passing the E&M signaling through a modem pair of the cellular modem pool ensures that the selected modem pair is functional before setting up the call. For example, if the E&M signaling was communicated from the cellular-side to the PSTN-side through the level-converter, a telephone call would be established independent of the ability of the selected modem pair to complete the call.

Modem pair 405-1 includes cellular-side modem 435-1 and PSTN-side modem 440-1. Other than the inventive concept, each of these modems is representative of an "AT&T Comsphere 3800plus." It should be noted that, except for incorporating the inventive concept, it is not required for cellular-side modem 435-1 and PSTN-side modem 440-1 to be similar models.

It is assumed that each modem of modem pair 405-1 can be configured to provide either a 4-wire interface, where there is a separate signaling pair for each direction of transmission, or a 2-wire interface, where transmit and receive signals share the same pair of electrical conductors. Since lines 421-1 and 426-1 are 4-wire interfaces, cellular-side modem 435-1 and PSTN-side modem 440-1 are pre-configured in a 4-wire mode. In addition, each modem provides an E&M signaling interface as described above and a switch control signal for a respective switch, as described below. In the context of the AT&T Comsphere 3800plus, the E&M signaling control signals are provided by utilizing one wire of the unused 2-wire interface and two spare (heretofore unused) control signals. The DTE interfaces of modems 440-1 and 435-1 are coupled together via line 406-1 to communicate data and E&M signaling as described below.

Like the call origination example described above, in the description that follows it is assumed that the cellular user is the calling party. In originating the cellular data call, the cellular user dials a group access code and a telephone number of the called party, herein associated with the PSTN data endpoint. Other than the inventive concept, it is assumed that switching system 245 functions as in the prior art, described above. That is, after detecting the group access code, which identifies the use of a cellular modem pool, switching system 245 selects idle modem pair 405-1 for use in the cellular data connection.

After switching in modem pair 405-1, switching system 245 provides an "off-hook" signal to cellular-side modem 435-1, via the E&M signaling, described above. Cellular-side modem 435-1 simply passes this "off-hook" signal to PSTN-side modem 440-1, via line 406-1 (described below). This "off-hook" signal is received by PSTN-side modem 440-1, which simply passes this "off-hook" signal back up to switching system 245, via level converter 420-1b, and D/A processor 415. As known in the art, switching system 245 provides the "off-hook" signal to PSTN 340, which replies with a "wink" signal to switching system 245. The latter communicates the E&M signaling back to PSTN-modem 440-1, which simply passes the "wink" signal to cellular-side modem 435-1 via line 406-1. Cellular-side modem 435-1 then provides the "wink" signal to switching system 245, via level converter 420-1a and D/A processor 415.

As known in the art, upon receiving the "wink" signal, switching system 245 provides a 6 digit code (which represents the called party telephone number dialed by the cellular user) via TDM bus 246. D/A processor 415 and level converter 420-1a convert the digital representation of the six digit code to a sequence of MF signals. In accordance with the inventive concept, this sequence of MF signals is provided to cellular-side modem 435-1 and switch 430-1, via the receive pair of line 421-1. Switch 430-1 includes two "cross-connect" switches that cross connect the 4-wire interface of line 421-1 to the 4-wire interface of line 426-1. For example, the receive pair of line 421-1 is coupled to the transmit pair of line 426-1, via switch 430-1a. This effectively couples the receive port, or transmit wire pair, of cellular-side modem 435-1 to the transmit port, or transmit wire pair, of PSTN modem 440-1. Similarly, switch 430-1b couples the receive pair of PSTN-side modem 440-1 to the transmit pair of cellular-side modem 435-1. Switch 430-1a is controlled via line 441-1 from PSTN-side modem 440-1, and switch 430-1b is controlled via line 436-1 from cellular-side modem 435-1. Both lines 436-1 and 441-1 utilize the above-mentioned switch control signal from each modem. It is assumed that switches 430-1a and 430-1b are both initially in the closed position. As a result, the sequence of MF signals is re-routed back to switching system 245 via switch 430-1a and level converter pair 420-1b. Upon detecting the six digit code, switching system 245 retrieves, and dials, the called party telephone number on the PSTN-side of the network. In addition, switch 430-1b couples any signals on the PSTN side of the call to the cellular side. Therefore, and, in accordance with the inventive concept, the calling party, e.g., the cellular user, can hear the call progress on the called party side of the connection. During the data call setup portion of the data call, these signals represent audio call progress information intelligible to the calling party. As a result, the calling party is also able to provide subsequent information, like calling card information for billing, to the PSTN side of the call.

As described above, transparent call progress allows the calling party to hear the call progress on the called party's side of the attempted cellular data connection by linking the audio path of the cellular channel to the audio path of the PSTN channel during the data call setup of the data call. In particular, when the cellular data call is being established by the MSC, the cellular modem pool passes the audio information unaltered (i.e., transparently) across the connection. This audio information contains the PSTN call progress information, such as, ringing without an answer, busy, fast busy, a person saying "Hello," etc.

Figure 3:
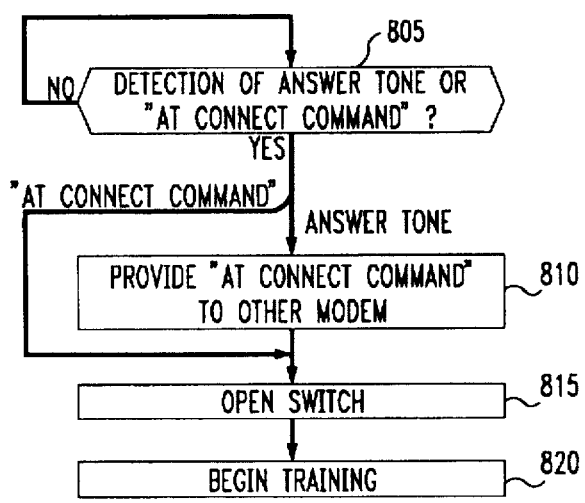
FIG. 3 is a flow chart of an illustrative method for use in the cellular modem pool of FIG. 2.

In order to facilitate understanding the inventive concept, reference can also be made to FIG. 3, which shows an illustrative method for use in each modem of modem pair 405-1 to couple the call progress signals from the calling party to the called party during the data call setup portion of the telephone call. Although switched in, each modem of modem pair 405-1 ignores any received MF signals and effectively delays the start of any negotiation process. In particular, each modem of modem pair 405-1 is in an idle state waiting for either the detection of an answer tone, or the detection of an "AT connect command," as shown in step 805 of FIG. 3. In this example, PSTN modem 300 of the far-end data endpoint eventually answers the incoming telephone call by transmitting an industry defined 2100 Hz answer tone. As known in the art, each modem of modem pair 405-1 has answer tone detectors. When an answer tone is detected, the respective modem first sends a predefined "AT connect command" to the other modem of the modem pair in step 810 and then opens the respective switch in step 815. This new predefined "AT connect command" conforms to the AT command set format and is simply a predefined data string. In this example, PSTN-side modem 440-1 detects the answer tone signal from PSTN modem 300. This answer tone signal is not coupled to cellular-side modem 435-1 since switch 430-1b provides the answer tone directly to the transmit pair of cellular-side modem 435-1. This results in the cellular user briefly hearing the start of the answer tone from PSTN modem 300, i.e., that a modem at the far end has answered. Upon detection of the answer tone, PSTN-side modem 440-1 provides a predefined "AT connect command" to cellular-side modem 435-1 via line 406-1 in step 810 and opens switch 430-1a in step 815. Once the switch is opened, PSTN-side modem 440-1 begins training, etc., to establish the data connection in step 820, i.e., PSTN-side modem is in a "non-idle" state.

Since cellular-side modem 435-1 does not detect the answer tone from PSTN modem 300, the above-mentioned "AT connect command" is utilized to alert the modem associated with the calling party to open the associated switch. In this example, upon detecting the "AT connect command" in step 805, cellular-side modem 435-1 opens switch 430-1b in step 815 and begins training with cellular modem 100 in step 820 to establish the cellular side of the data connection, i.e., cellular-side modem 435-1 is in a "non-idle" state.

Once the data connection is established, it is assumed that cellular-side modem 435-1 operates in accordance with a cellular-oriented protocol while PSTN-side modem 440-1 operates in accordance with a traditional land-line oriented protocol. Upon disconnecting the data call, each modem resets its respective switch to the closed position, e.g., cellular-side modem 435-1 closes switch 430-1b, and reverts to the "idle state.

Figure 4:
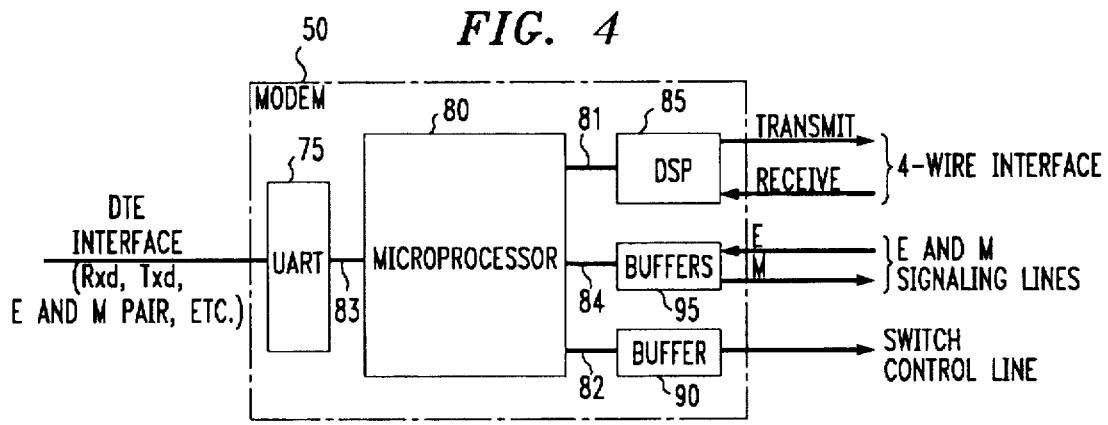
FIG. 4 is a block diagram of a modem.

FIG. 4 shows an illustrative high-level block diagram of a modem for use in the cellular modem pool of FIG. 2. In particular, modem 50 includes a microprocessor 80, which includes associated memory, a digital signal processor 85, e.g., for providing the tone detector and other modem functions mentioned above, universal/asynchronous receive transmit (UART) 75 for providing the DTE interface, a buffer 90 for driving the switch control signal that opens and closes the respective switch, and a buffer 95 that both terminates and drives the E&M signaling. Microprocessor 80 is a stored-program controlled processor, e.g., the flow chart of FIG. 3 is a part of the program executed by microprocessor 80 of the modem. Microprocessor 80 is coupled to DSP 85 via line 81, which represents, address, data, control, and status leads. For example, DSP 85 signals microprocessor 80 via line 81.

Microprocessor 80 controls its respective switch via buffer 90, which provides the switch control signal. Similarly, microprocessor 80 communicates E&M signaling via buffer 95. It is assumed that buffer 95 includes circuitry to interrupt microprocessor 80 upon a change in the signal level of the received E&M signal, e.g., the detection of an "off-hook" signal, which is typically represented by a change from one TTL level to another TTL level, e.g., logical ZERO to a logical ONE. (Alternatively, microprocessor 80 can "poll" the status of the received E&M signal.) Microprocessor 80 communicates any E&M signaling to, and from, the opposite modem of the modem pair via the DTE interface provide by UART 75. It is assumed that the E&M signaling is conveyed via the DTE interface by the use of two, heretofore unused, lines of the DTE interface, which includes signals like transmit data (Txd), receive data (Rxd), clear-to-send (CTS), request-to-send (RTS), etc. Alternatively, a new "AT command" can be defined that passes the E&M signaling information between the modems of the modem pair. Similarly, in the reverse direction, microprocessor 80 is alerted of any change in the E&M signal from the opposite modem via the UART interface. Upon detecting a change in the E&M signaling, microprocessor 80 simply regenerates the detected E&M signal via buffer 95. For example, if microprocessor 80 detects a "wink" signal, which is typically a pulse of predefined width, microprocessor 80 simply regenerates the predefined "wink" signal via buffer 95. That is, microprocessor 80 simply passes any E&M signaling from the DCE side to the DTE side, and vice versa.

Figure 5:
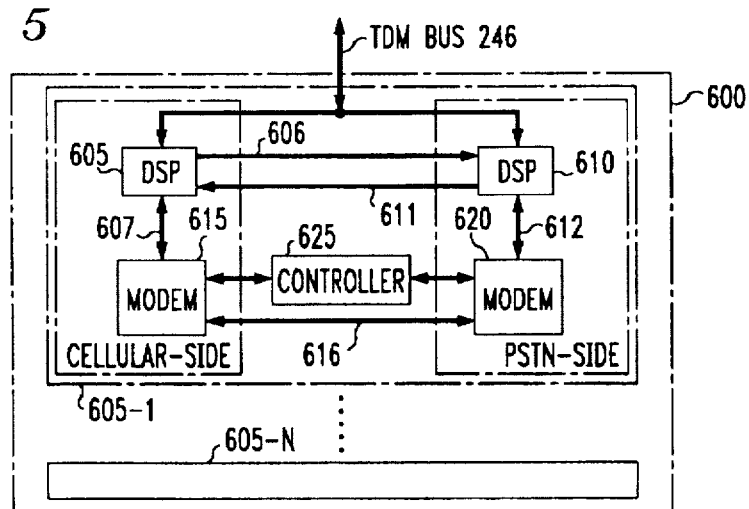
FIG. 5 is a block diagram of another embodiment of a cellular modem pool embodying the principles of the invention.

Another embodiment of the invention is shown in FIG. 5. The latter embodiment is functionally similar to the embodiment of FIG. 2 except that the embodiment of FIG. 5 uses a "mu-law" modem pair. Other than the inventive concept, the elements shown in FIG. 5 are well-known and will not be described in detail. The remaining components of the cellular data connection are identical to those elements shown in FIG. 1 and will not be further described. Also, like numbers in FIGS. 1 and 5 are representative of the same components. For example, TDM bus 246 of FIG. 5 and FIG. 1 is the same.

Cellular modem pool 420 includes a number of modem pairs as represented by modem pair 605-1. For the purposes of this example, it is assumed that modem pair 605-1 is incorporated onto a single circuit board. Each modem of the modem pair is a "mu-law" modem as is known in the art. A "mu-law modem" directly couples to TDM bus 246. Modem pair 605-1 comprises digital signal processor (DSP) 605, DSP 610, modem 615, modem 620, and controller 625. This modem pair can equivalently be partitioned into a cellular-side modem including DSP 605 and modem 615, and a PSTN-side modem including DSP 610 and modem 620. Modems 615 and 620 provide the modem functionality e.g., negotiate the data connection, modulate the data, etc., while DSP 605 and DSP 620 are representative of an Analog Devices DSP-2111 programmed as a TDM bus interface processor. Controller 625 is representative of a microprocessor and associated circuitry, memory, etc., which controls the operation of the modem pair. (Since it is assumed that the embodiment of FIG. 5 is incorporated onto a single circuit board, this allows controller 625 to be shared between the cellular-side and the PSTN-side as opposed to having dedicated controller circuitry within modem 615 and modem 620.)

Other than the inventive concept, both DSP 605 and DSP 620 remove and insert information into pre-assigned timeslots, as known in the art, according to the above-mentioned time-division multiplexed protocol for communicating information to, and from, switching system 245. For example, during the data connection, DSP 605 couples signals to, and from, modem 615; and DSP 610 couples signals to, and from, modem 620. As in the prior art, both modem 615 and modem 620 are connected together via line 616. However, and in accordance with the inventive concept, both DSP 605 and DSP 620 are also coupled together via lines 606 and 611. In this embodiment, there is no cross-connect switch. Rather, each DSP is programmed to "switch" any received signal to the other DSP. For example, during the "idle" state, i.e., when no data connection yet exists, DSP 605 provides any received signal to DSP 610 via line 606. The latter provides the received signal back to TDM bus 246 for transmission to the PSTN side of the call. Similarly, DSP 610 provides any received signal from the PSTN side of the call to DSP 605 via line 611 for transmission back to the cellular-side of the call via TDM bus 246. This coupling between DSP 605 and DSP 610 provides transparent call progress. Finally, DSP 605 and 615 also transparently pass between each other any equivalent E&M signaling, which is represented by the "A/B" bits in the T1 interface, which represents signaling like "off-hook," etc.

However, and in accordance with the invention, upon detection of a 2100 Hz answer tone, both DSP 605 and 610 open the connection to each other and, instead, provide any received signal to the respective modem. For example, if the cellular user originates the call, eventually PSTN modem 300 provides an answer tone for transmission back toward the calling party. When DSP 610 detects this answer tone, DSP 610 provides any received signal to PSTN-side modem 620 via line 612, and stops sending a signal on line 611. PSTN-side modem 620, upon detection of the answer tone, sends the above-described "AT connect command" to cellular-side modem 615, via line 616. Upon detection of the "AT connect command," cellular-side modem 615 provides an answer tone on line 607 for transmission back to cellular modem 100. This answer tone is detected by DSP 605, which then stops transmitting information to DSP 610 via line 606, and, instead, couples any received information from TDM bus 246 to cellular-side modem 615 via line 607.

It should be noted that when establishing a cellular data connection from the PSTN-side, a similar problem exists for a calling party on the PSTN side, i.e., the PSTN user cannot hear the call progress on the cellular side. Consequently, the above described inventive concept could similarly be used to provide call progress information to the PSTN user. However, it should be realized, that the PSTN network providers have not yet provided an access code, which a PSTN user can dial, that requires that the data call use a cellular modem pool.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., a modem, etc., the functions of any one or more of those building blocks can be carried out using one or more appropriate programmed processors, e.g., a digital signal processor. In addition, despite being shown as discrete modems, it should be realized that a modem pair can be equivalently incorporated onto a signal circuit board. Such an incorporation may allow the sharing of circuitry to perform some of the above-described functions. Also, although the embodiment of FIG. 2 showed each coupling means as being associated with a modem pair, the coupling means may be a resource distinct from a modem pair and dynamically allocated by the cellular modem pool to a modem pair. Other changes are also possible. For example, notwithstanding the invention was shown in the context of a cellular modem pool, it should be realized that changes could be made to a switching system to equivalently delay the switching in of a modem pair of the cellular modem pool during the data call setup portion of the data call. Finally, although the E&M signaling was communicated through each modem of a modem pair, the E&M signaling could be coupled through other parts of the system, like the respective level converters.

What is claimed:

1. A cellular pool apparatus for use in a cellular data connection, the apparatus comprising:

means for coupling at least one signal representative of call progress information between a first communications channel associated with a cellular-side of the cellular data connection and a second communications channel associated with a PSTN-side of the cellular data connection during a data call setup portion of a data call; and modem means coupled to the first communications channel and the second communications channel for establishing the cellular data connection subsequent to the data call setup portion of the data call; and wherein the modem means includes a means for passing E-port and M-port analog signals (E&M signaling) between the cellular-side and the PSTN-side of the cellular data connection.

2. A cellular pool apparatus for use in a cellular data connection, the apparatus comprising:

means for coupling at least one signal representative of call progress information between a first communications channel associated with a cellular-side of the cellular data connection and a second communications channel associated with a PSTN-side of the cellular data connection during a data call setup portion of a data call; and modem means coupled to the first communications channel and the second communications channel for establishing the cellular data connection subsequent to the data call setup portion of the data call;

wherein the first communications channel and the second communications channel are separate 4-wire communications channels and the means for coupling cross-connects the respective transmit and receive pairs of the first and second communications channels.

3. A cellular pool apparatus for use in a cellular data connection, the apparatus comprising:

means for coupling at least one signal representative of call progress information between a first communications channel associated with a cellular-side of the cellular data connection and a second communications channel associated with a PSTN-side of the cellular data connection during a data call setup portion of a data call; and modem means coupled to the first communications channel and the second communications channel for establishing the cellular data connection subsequent to the data call setup portion of the data call; and wherein the modem pair includes two mu-law modems.

4. An improved cellular modem pool apparatus for providing a data connection between a calling party and a called party, the data connection comprising a cellular portion and a non-cellular portion, the apparatus including a modem means for terminating one end of the cellular portion of the data connection and a modem means for terminating one end of the non-cellular portion of the data connection, wherein the improvement comprises:

means for coupling the cellular portion of the data connection to the non-cellular portion of the data connection to provide audio call progress signals to the calling party before establishing the data connection; and wherein the modem means includes a means for passing E-port and M-port analog signals (E&M signaling) between the cellular-side and the PSTN-side of the cellular data connection.

5. A method for use in establishing a cellular data connection through a cellular modem pool, the method comprising the steps of:

coupling call progress information between a cellular-side of the cellular data connection and a non-cellular side of the cellular data connection during a data call setup portion of a data call; and blocking the coupling of the call progress information subsequent to the data call setup portion of the data call; and further comprising the step of passing E-port and M-port analog signals (E&M signaling) information through a modem pair of the cellular modem pool prior to the coupling step.

6. A method for establishing a cellular data connection comprising the steps of:

communicating call progress information between a cellular-side of the cellular data connection and a non-cellular side of the data connection during a call setup portion of a data call until detection of a data signal from a data communications equipment of the called party; and establishing the cellular data connection through a cellular modem pool subsequent to the detection of the data signal; and further comprising the step of passing E-port and M-port analog signals (E&M signaling) information through a modem pair of the cellular modem pool prior to the coupling step.

* * * * *